United States Patent
Kimura et al.

(10) Patent No.: US 8,902,157 B2
(45) Date of Patent: Dec. 2, 2014

(54) IMAGE DISPLAY UNIT AND IMAGE FORMING APPARATUS INCLUDING THE SAME

(75) Inventors: Yoichi Kimura, Osaka (JP); Kunihisa Chiba, Osaka (JP); Kazuyuki Ogida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 13/104,692

(22) Filed: May 10, 2011

(65) Prior Publication Data

US 2011/0279360 A1    Nov. 17, 2011

(30) Foreign Application Priority Data

May 11, 2010   (JP) .................................. 2010-109394

(51) Int. Cl.
*G09G 5/00* (2006.01)
*H04N 1/00* (2006.01)
*G03G 15/00* (2006.01)

(52) U.S. Cl.
CPC ....... *H04N 1/00442* (2013.01); *H04N 1/00445* (2013.01); *H04N 1/00477* (2013.01); *H04N 1/0048* (2013.01); *H04N 1/00708* (2013.01); *H04N 1/00724* (2013.01); *G03G 15/502* (2013.01); *G03G 2215/00109* (2013.01)
USPC .............................. 345/156; 358/1.8; 358/1.9

(58) Field of Classification Search
CPC .................. G03G 15/502; G03G 2215/00109
USPC ............................ 345/156–184; 348/1.1, 1.13
See application file for complete search history.

(56) References Cited

U.S. PATENT DOCUMENTS

| 4,657,376 | A * | 4/1987 | Ide .................................. 399/76 |
| 4,835,572 | A * | 5/1989 | Ide .................................. 399/86 |
| 5,905,935 | A * | 5/1999 | Wakamatsu et al. .......... 399/407 |
| 6,642,943 | B1 * | 11/2003 | Machida ........................ 715/763 |
| 7,990,580 | B2 | 8/2011 | Motoyoshi |
| 2001/0035988 | A1* | 11/2001 | Semba et al. ................. 358/518 |
| 2003/0072044 | A1* | 4/2003 | Hashiguchi et al. .......... 358/520 |
| 2006/0039022 | A1* | 2/2006 | Kondo .......................... 358/1.13 |
| 2006/0119902 | A1* | 6/2006 | Ahmed et al. ................ 358/474 |
| 2007/0086794 | A1* | 4/2007 | Sasaki et al. .................... 399/16 |
| 2008/0088868 | A1* | 4/2008 | Endo ............................ 358/1.13 |
| 2008/0100885 | A1* | 5/2008 | Onishi .......................... 358/488 |
| 2008/0151294 | A1* | 6/2008 | Natori et al. ................. 358/1.15 |

(Continued)

FOREIGN PATENT DOCUMENTS

| CN | 101271299 A | 9/2008 |
| JP | 7-23147 A | 1/1995 |

(Continued)

*Primary Examiner* — Quan-Zhen Wang
*Assistant Examiner* — Chun-Nan Lin
(74) *Attorney, Agent, or Firm* — Birch, Stewart, Kolasch & Birch, LLP

(57) ABSTRACT

An image display unit capable of displaying image data pagewise includes: a scanner portion; a display panel for displaying input image data in preview representation; an input condition determiner that compares the image data successively input through the scanner portion, as to input condition and determines whether there is any change in the image data input condition; and a display controller that, when the input condition determiner determines that the input image data has changed in the input condition, makes control such as to display the image data that was determined to have changed in the input condition and the image data input immediately before the image data in question, together on the display panel.

7 Claims, 6 Drawing Sheets

(56) References Cited

U.S. PATENT DOCUMENTS

| | | | |
|---|---|---|---|
| 2008/0231914 A1* | 9/2008 | Motoyoshi | 358/474 |
| 2009/0279744 A1* | 11/2009 | Zimmerman | 382/112 |
| 2010/0020368 A1* | 1/2010 | Kawabuchi et al. | 358/474 |
| 2010/0053697 A1* | 3/2010 | Kubota | 358/449 |
| 2010/0058180 A1* | 3/2010 | Hirayama et al. | 715/274 |
| 2010/0107064 A1 | 4/2010 | Yamaguchi et al. | |
| 2010/0123928 A1* | 5/2010 | Morimoto et al. | 358/1.15 |
| 2010/0134816 A1* | 6/2010 | Dantwala | 358/1.13 |
| 2010/0214619 A1* | 8/2010 | Sudo | 358/3.24 |
| 2011/0135178 A1* | 6/2011 | Sato | 382/130 |
| 2011/0246947 A1* | 10/2011 | Hirohata et al. | 715/838 |
| 2012/0057795 A1* | 3/2012 | Konishi | 382/195 |

FOREIGN PATENT DOCUMENTS

| | | | | |
|---|---|---|---|---|
| JP | 2002-312385 A | 10/2002 | | |
| JP | 2005-189537 A | 7/2005 | | |
| JP | 2006-72484 A | 3/2006 | | |
| JP | 2009-88693 A | 4/2009 | | |
| JP | 2009088693 | * | 4/2009 | H04N 1/00 |
| JP | 2009-169675 A | 7/2009 | | |

* cited by examiner

IMAGE DISPLAY UNIT AND IMAGE FORMING APPARATUS INCLUDING THE SAME

This Nonprovisional application claims priority under 35 U.S.C. §119 (a) on Patent Application No. 2010-109394 filed in Japan on 11 May 2010, the entire contents of which are hereby incorporated by reference.

BACKGROUND OF THE INVENTION (1) Field of the Invention

The present invention relates to an image display unit for use in an electrophotographic image forming apparatus such a copier, printer, facsimile machine or the like and an image forming apparatus including the display device, in particular, relating to an image display unit capable of displaying plural pages of document images in a preview representation as well as to an image forming apparatus including the same.

(2) Description of the Related Art

A conventional digital multifunctional machine including an image forming unit, scanner and the like, captures document images as image data through the scanner, stores the image data into memory and performs image recording of the image data based on the stored image data in the memory, in accordance with the conditions the user designates, such as the number of copies etc., to complete recorded matter.

In this digital multifunctional machine, if the document set on the scanner consists of multiple pages, the bundle of documents is set on the document tray of a conventionally existing automatic document feeder so that the documents are delivered one by one towards the document reader of the scanner, whereby the image of each document can be read.

In this sequential reading process of documents, some conventional apparatuses have been adapted to successively compare one document to the next and ask the operator to confirm continuation of the current job if any change of documents in image color type (color or monochrome), size, etc., was found by the comparison.

As a conventional technology, there is a disclosure of an image forming apparatus which gives a warning to ask the user to check when the color type (color or monochrome) of the output image designated by the user is different from the color type (color or monochrome) of the original images that have been actually scanned (see Patent Document 1).

As other examples, there is a technology in which if a change in document characteristics (common properties: document size, color document or monochrome document) is observed during scanning multiple documents, scanning is suspended to inform the user of that fact and ask the user to check the documents (see Patent Document 2). There is still another technology in which the document being scanned is determined to be color or monochrome so as to display a preview of the image of the document only when the document is a color one (see Patent Document 3).

Patent Document 1:
Japanese Patent Application Laid-open 2005-189537
Patent Document 2:
Japanese Patent Application Laid-open H07-23147
Patent Document 3:
Japanese Patent Application Laid-open 2009-88693

However, any of the aforementioned prior art technologies are to warn the user to check the size and/or color type (color or monochrome) of the original documents, so that they were not to seek user confirmation after informing the user of the status of the documents. Therefore, the user still had to check what state the documents is in.

SUMMARY OF THE INVENTION

The present invention has been devised in view of the above problems, it is therefore an object of the invention to provide an image display unit as well as an image forming apparatus including this, in which, when data of multiple images is input, the user is able to easily confirm the change of conditions such as the document size and color type of the input image data.

The first aspect of the present invention resides in an image display unit capable of displaying image data page-wise, comprising: an image data input portion for receiving input image data; a display portion for displaying the image data input from the image data input portion in preview representation; an input condition determiner that compares the image data successively input through the image data input portion, as to image data input condition so as to determine whether there is any change in the image data input condition; and, a display controller that, when the input condition determiner determines that the input image data has changed in the input condition, makes control such as to display the image data that was determined to have changed in the input condition and the image data input immediately before the image data in question (i.e., the image data located on the previous page), together on the display portion.

The second aspect of the present invention is characterized in that the display controller makes control such as to display also the image data input immediately after the image data (i.e., the image data located on the next page) that was determined to have changed in the input condition, on the display portion.

The third aspect of the invention is characterized in that the input condition is document size information.

The fourth aspect of the invention is characterized in that the input condition is color type information.

The fifth aspect of the invention resides in an image forming apparatus including the image display unit having any one of the above first to fourth aspects.

According to the first aspect of the present invention, since the image data that was determined to have changed in the input condition of image data and the image data for reference, i.e., the image data input immediately before the image data in question (image data located on the previous page) can be displayed together on the display portion, it is possible for the user to easily confirm how the input condition of the input image data has changed.

According to the second aspect of the present invention, the page of image data that was determined to have changed is displayed in preview representation by being placed between the images on the pages located before and after the page in question, hence it is possible to easily confirm change of pages.

According to the third aspect of the present invention, it is possible to easily confirm the status of existence of documents different in size.

According to the fourth aspect of the present invention, for example, by checking change in color, i.e., monochrome or color, or existence of both, it is possible to easily confirm the mixed status of monochrome and color images.

According to the fifth aspect of the present invention, since the image data that was determined to have changed in the input condition of image data and the image data for reference, or the image data input immediately before the image data in question (image data located on the previous page) can be displayed together on the display portion, it is possible for the user to easily confirm how the input condition of the input image data has changed. As a result it is possible to realize optimal image output in conformity with document images.

DETAILED DESCRIPTION OF THE INVENTION

The embodiment of the present invention will hereinafter be described in detail with reference to the accompanying drawings.

Figure 1:
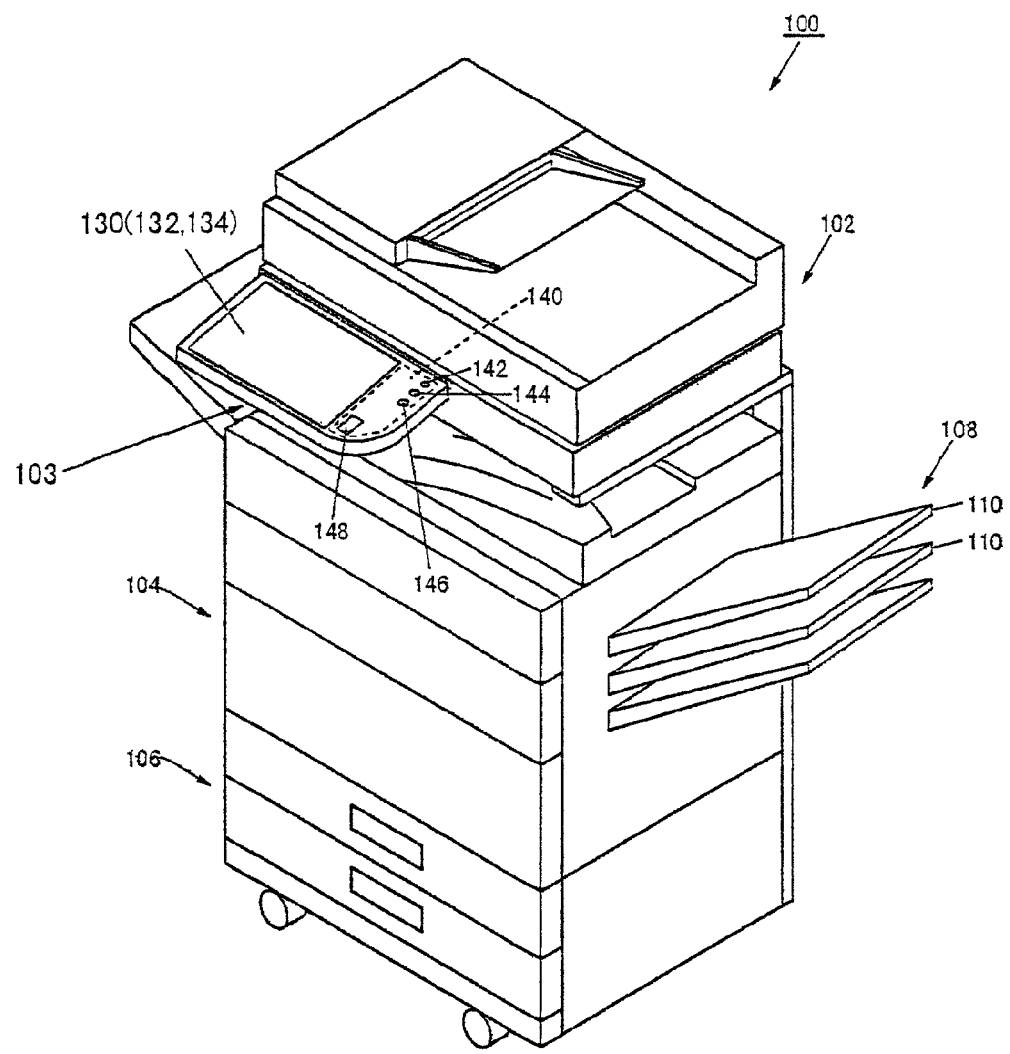
FIG. 1 is an illustrative view showing an overall configuration of an image forming apparatus to which an image display unit according to the embodiment of the present invention is applied.

FIG. 1 is an illustrative view showing an overall configuration of an image forming apparatus 100 to which an image display unit 1 (FIG. 2) according to the present embodiment of the invention is applied.

As shown in FIG. 1, image forming apparatus 100 includes: a scanner portion (image data input unit) 102 for capturing image data; and an operational portion 103 having a display panel (display portion) 132 for providing preview display of image data captured and input by scanner portion 102. Display panel (display portion) 132 can display multiple preview images of page-wise image data.

Though the present embodiment will be described on the assumption that the preview images of multiple document images displayed on display panel 132 are given as image data (a bundle of documents given as a job) of documents captured by scanner portion 102 etc., of image forming apparatus 100, the image data taken in by image forming apparatus 100 may be given as image data input in communication with a terminal computer outside image forming apparatus 100 or image data that is stored in an external memory and loaded through a memory card slot or radio communication.

The apparatus to which image display unit 1 is mounted is not limited to image forming apparatus 100, but may be an image processing apparatus or electronic device other than image forming apparatus 100.

This image forming apparatus 100 forms images on recording paper based on electrophotography.

Further, image forming apparatus 100 includes, as its operation mode, copy mode, facsimile mode (FAX mode), document filing mode (a mode in which scanned images are stored in a storage inside the image forming apparatus) and mail mode (a mode in which scanned images are transmitted in the form of a file attached to an e-mail). This image forming apparatus 100 may further have a network printer mode.

To begin with, image forming apparatus 100 will be described.

As shown in FIG. 1, image forming apparatus 100 includes image display unit 1 (FIG. 2) essentially comprised of scanner portion 102 and an operational portion 103, a printer portion processor) 108.

Scanner portion 102 is mounted on top of the apparatus body and reads image information from documents.

Operational portion 103 includes a touch-panel display 130 and a display control portion 140, and is arranged at the top of the apparatus body on the user' operating side (front side).

Touch panel display 130 is comprised of a display panel 132 of a liquid crystal panel and the like and a touch panel 134 that is laid over display panel 132 to detect the positions the user presses with fingers.

Display control portion 140 includes an indication lamp 142, a power key 144, an energy-save key 146 and a home key 148. Home key 148 is the key that resets the display content on touch panel display 130 to the home screen for operational mode selection.

In this way, image forming apparatus 100 has touch panel display 130 as a main control device and also has display control portion 140 that includes hardware keys and indication lamp. The keys (power key 144, energy-save key 146 and home key 148) on display control portion 140 are given as hardware buttons, in contrast to software buttons formed by touch panel display 130.

It should be noted that display control portion 140 may be formed of touch panel display 130 only by replacing the aforementioned hardware buttons with software buttons.

In paper discharger 108, a plurality of recording sheets are sorted and discharged to individual paper output trays 110, and/or each set of recording sheets is punched or stapled. For example, when multiple copies of printed documents are prepared, the printed recording sheets are sorted and discharged to individual paper output trays 110 so that each set of recording paper is allotted to different paper output tray 110. The thus sorted recording sheets on each paper output tray 110 are individually punched or stapled into individual printed matter.

Next, the configuration of image forming apparatus 100 will be described with reference to a block diagram.

Figure 2:
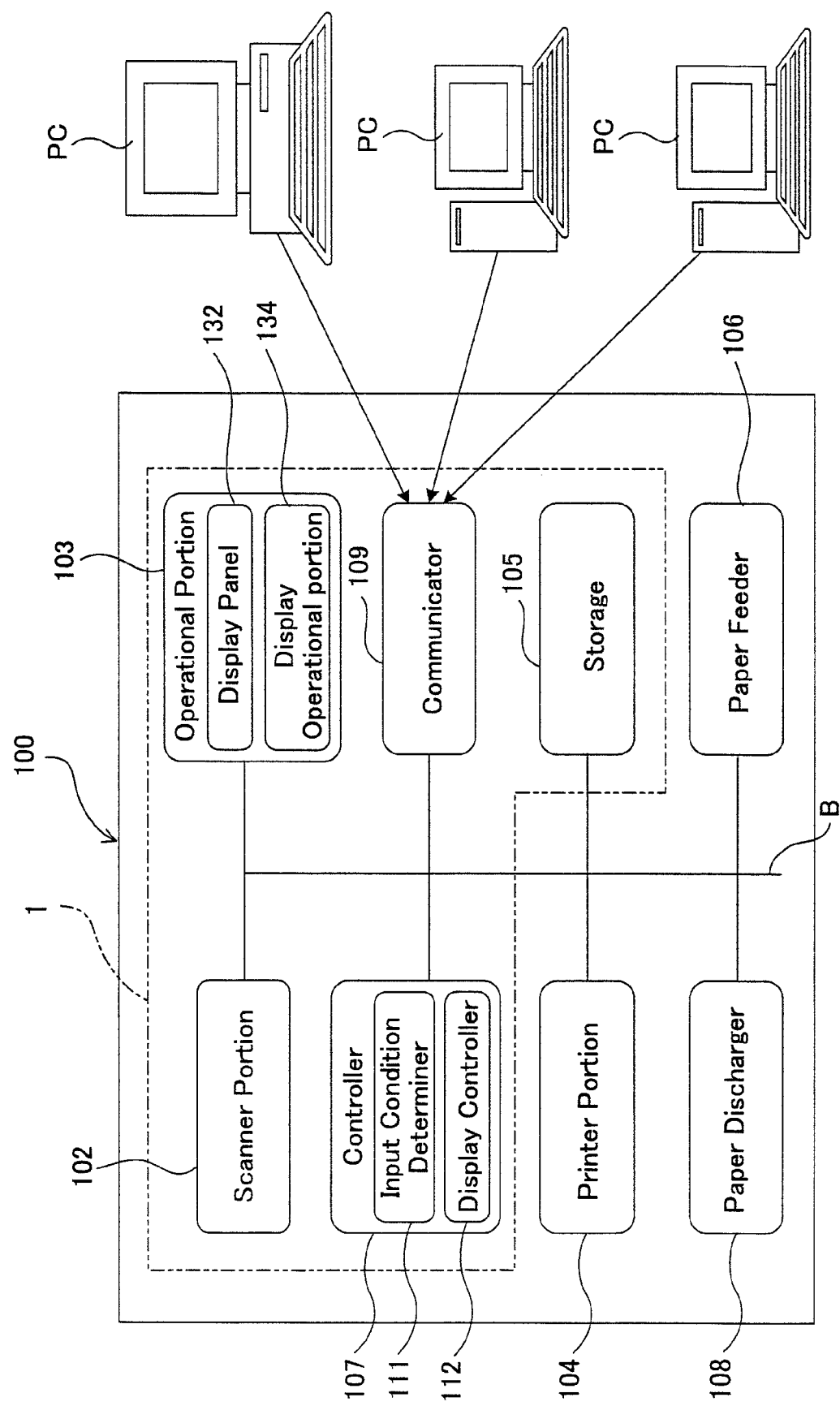
FIG. 2 is an illustrative view with a block diagram of the image forming apparatus, showing terminal computers being connected to the image forming apparatus via communication lines.

FIG. 2 is an illustrative view with a block diagram of image forming apparatus 100, showing terminal computers PC being connected to the image forming apparatus 100 via communication lines.

As shown in FIG. 2, image forming apparatus 100 includes scanner portion 102, operational portion 103, printer portion 104, a storage 105, paper feeder 106, a controller 107, paper discharger 108 and a communicator 109, each being connected to a bus B.

Image display unit 1 is mainly comprised of scanner portion 102, operational portion 103, storage 105 and controller 107.

Scanner portion 102 is arranged on top of the apparatus body and reads document images.

Operational portion 103 receives image forming conditions and a start command to the apparatus from the user and gives notice of information to be notified from the apparatus to the user by means of display panel 132.

Storage 105 offers a function as a working memory for temporarily storing the result of operations and processing by controller 107 and a function as a frame memory for recording image data. Accordingly, storage 105 records the image data input from external terminal computers PC and the like to this apparatus and image data of documents captured by scanner portion 102.

Controller 107 controls the operation of image display unit 1 as well as the mechanisms of the whole apparatus. Controller 107 includes an input condition determiner 111 and a display controller 112.

Input condition determiner 111 successively compares multiple pages of image data on multiple document images of one job, captured by image display unit 1, or compares one page with the next, so as to determine whether there is a change in input conditions (e.g., document size, the color type of document image (color or monochrome)) of the document images in the job. That is, input condition determiner 111 compares the input conditions of the image data of two consecutive documents scanned successively by scanner portion 102 to determine whether there is any change in the input conditions between the image data of the two consecutive documents.

In the present embodiment, input condition determiner 111 has a function of determining whether or not the documents have changed in size based on the document size information (document size determining function) and a function of determining whether or not the documents have changed in color type (e.g., color or monochrome) based on the color type information on image data (document image color type determining function), as the capabilities to determine the input conditions of the image data of the documents captured by scanner portion 102.

When a change in input conditions has been detected from the input image data, display controller 112 makes control based on the determined result from input condition determiner 111 so as to display the image data that was determined to have changed in input conditions and the image data input immediately before the image data in question, together on display panel 132.

Further, when a change in input conditions has been detected from the input image data by input condition determiner 111, display controller 112 may make control so as to display the image data in question and the image data input immediately after the image data in question, together on display panel 132. Thus, image display unit 1 is configured.

Printer portion 104 performs image forming based on image data input to image forming apparatus 100.

Paper feeder 106 pulls out recording paper, one sheet at a time, from a stack of recording paper accommodated in the paper cassette (not shown) inside image forming apparatus 100 or the recording paper stacked on a manual feed tray (not shown) outside the apparatus, and delivers the sheet to printer portion 104.

Paper discharger 108 discharges recorded matter that is formed by image forming apparatus 100.

Communicator 109 is connected to terminal computers PC outside image forming apparatus 100 to enable communication with the terminal computers PC.

Specifically, a public line for exchange of image data is connected to communicator 109 of image forming apparatus 100 while a network line is connected to an unillustrated network interface. This network line may be connected to external terminal computers PC that use this image forming portion 100 as a network support printer or may be connected via the internet to a computer etc. that is designated by a URL (Uniform Resource Locator). When connected to the Internet in this way, the image forming apparatus 100 can obtain the necessary information by way of the Internet.

Referring next to the drawings, specific description will be made on the preview display of document images in image display unit 1 when image forming apparatus 100 reads documents.

EXAMPLE 1

To begin with, a case where a plurality of documents to be read include documents having images different in color (color type) will be described.

Figure 3A:
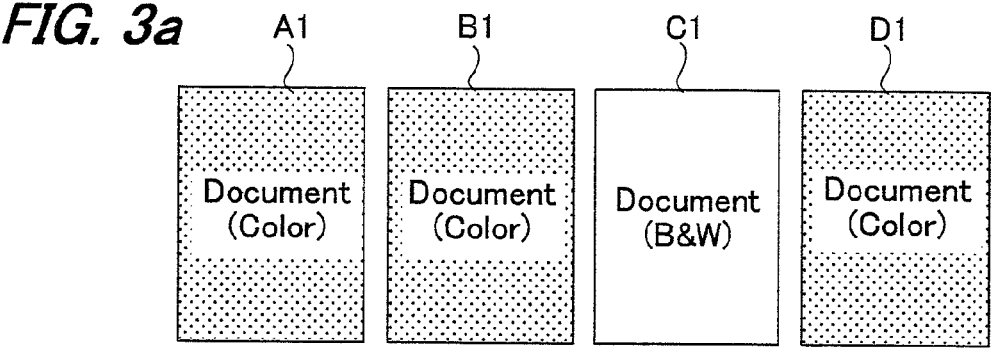
FIG. 3a is an illustrative view showing an example where a plurality of documents to be scanned by the image forming apparatus include documents having document images different in color type.

FIG. 3a is an illustrative view showing an example where a plurality of documents A1-D1 to be scanned by the image forming apparatus of the present embodiment include documents with document images different in color type.

Figure 3B:
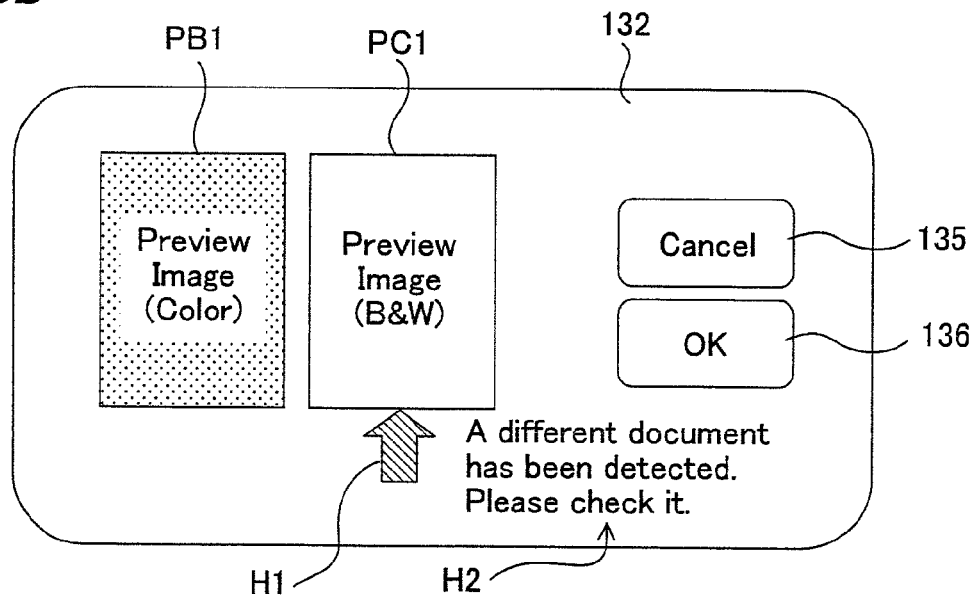
FIG. 3b is an illustrative view showing a display panel of the image forming apparatus, on which a preview image of a document having a document image different in color type from a reference document and a preview image of a document (the reference document) scanned immediately before the document in question, are displayed side by side.

FIG. 3b is an illustrative view showing display panel 132 of the image forming apparatus, on which a preview image PC1 of a document C1 having a document image different in color type from a reference document and a preview image PB1 of a document B1 (the reference document) scanned immediately before the document C1, are displayed side by side.

Figure 3C:
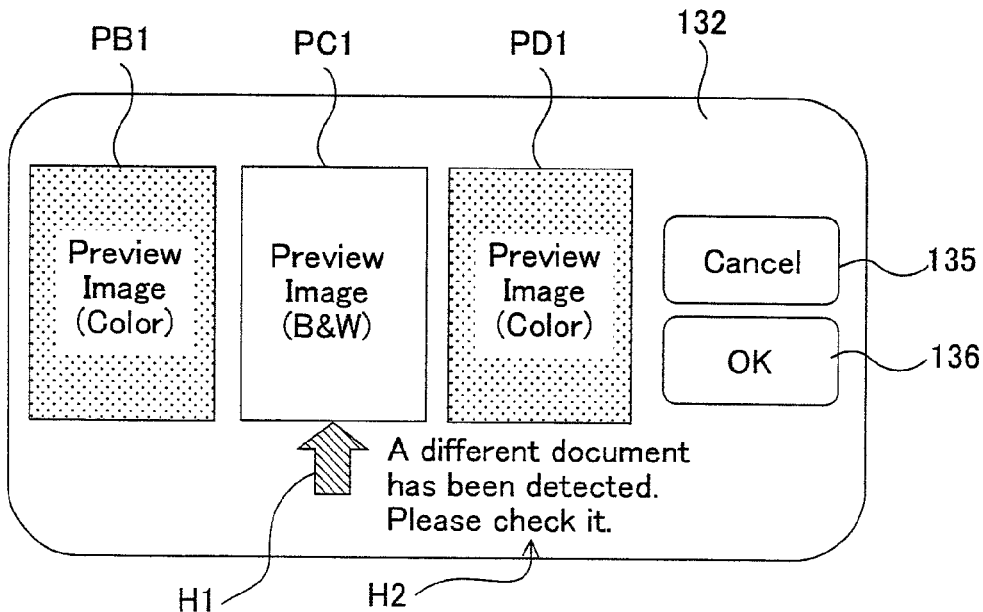
FIG. 3c is an illustrative view showing a display panel of the image forming apparatus, on which a preview image of a document having a document image different in color type from a reference document and preview images of documents that are scanned before and after the document in question, are displayed side by side.

FIG. 3c is an illustrative view showing display panel 132 of the image forming apparatus, on which preview image PC1 of document C1 having a document image different in color type from the reference document and preview images PB1 and PD1 of documents (reference documents) B1 and D1 that are scanned before and after the document C1, are displayed side by side.

In example 1, multiple documents A1-D1 input into image forming apparatus 100 include color documents A1, B1 and D1 and a monochrome document C1, as shown in FIG. 3a.

Image data of documents A1, B1, C1 and D1 are successively read by scanner portion 102 of image display unit 1 and recorded into storage 105. Then, based on the recorded image data (document page data), input condition determiner 111 successively determines whether there is a change in color type as one of the document image input conditions, between one document and the next.

As a result, input determiner 111 determines that the first two pages, i.e., the document images of documents A1 and B1 are color, the document image of document C1 is monochrome, and that the color type of document C1 is different from that of the previous page or document B1.

Then, based on the determined result from input condition determiner 111, display controller 112 displays a preview image PC1 of monochrome document C1 having a document image different in color type from the other documents and a preview image PB1 of document B1 as the reference for comparison, on display panel 132, as shown in FIG. 3b.

At this time, an arrow H1 that indicates preview image PC1 of document C1 to be checked is displayed on display panel 132, with a message H2, for example "A different document has been detected. Please check it" for promoting the user to confirm the document, arranged near arrow H1.

In the drawings, reference numerals 135 and 136 are "Cancel key" and "OK key" to allow the user having checked the preview display to input user confirmation to make reading of the document valid and invalid, respectively.

As described above, in example 1, image display unit 1 displays preview image PB1 of the second document B1 to be the reference for comparison on the document image color type as one of document input conditions and preview image PC1 of the third document C1 to be checked, at the same time. Accordingly, it is possible for the user to easily compare and confirm that there is difference in document image color type between document B1 as the reference for comparison and the document image of document C1, among the multiple pages of documents A1, B1, C1 and D1.

As a variation of example 1, the preview display by display controller 112 may be given such that in addition to preview image PB1 of document B1 or the previous page of document C1 to be checked, preview image PD1 of the next page, or document D1 may be arranged so as to place the preview image PC1 to be confirmed between the two. This arrangement enables the user to much more easily confirm how document C1 to be checked is different from documents B1 and D1 as the reference for comparison, among the multiple pages of documents A1, B1, C1 and D1.

EXAMPLE 2

Next, a case where a plurality of documents to be read include documents having different sizes will be described.

Figure 4A:
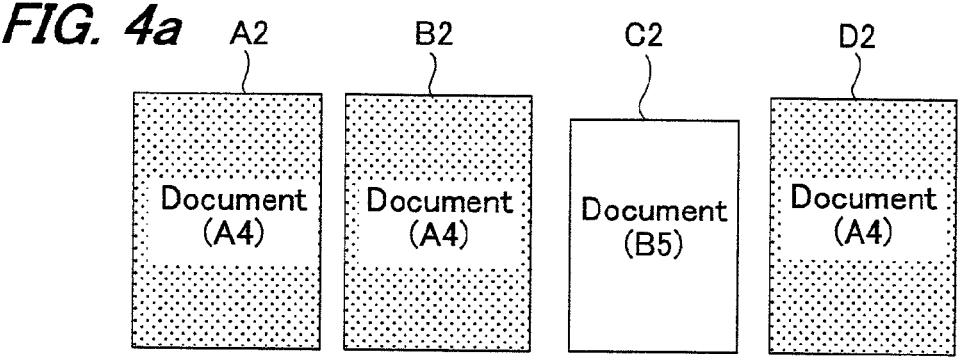
FIG. 4a is an illustrative view showing an example where a plurality of documents to be scanned by the image forming apparatus include documents different in size.

FIG. 4a is an illustrative view showing an example where a plurality of documents A2-D2 to be scanned by the image forming apparatus of the present embodiment include a document C2 that is different in size from the others.

Figure 4B:
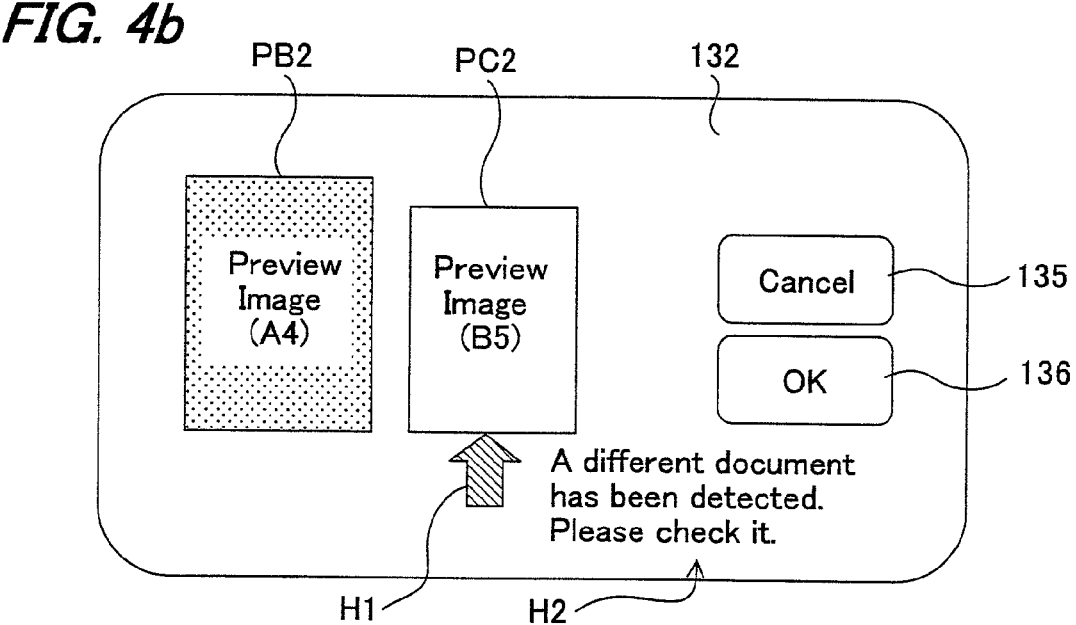
FIG. 4b is an illustrative view showing a display panel of the image forming apparatus, on which a preview image of a document different in size from a reference document and a preview image of a document (the reference document) scanned immediately before the document in question, are displayed side by side.

FIG. 4b is an illustrative view showing display panel 132 of the image forming apparatus, on which a preview image PC2 of a document C2 different in size from a reference document and a preview image PB2 of a document B2 (the reference document) scanned immediately before the document C2, are displayed side by side.

Figure 4C:
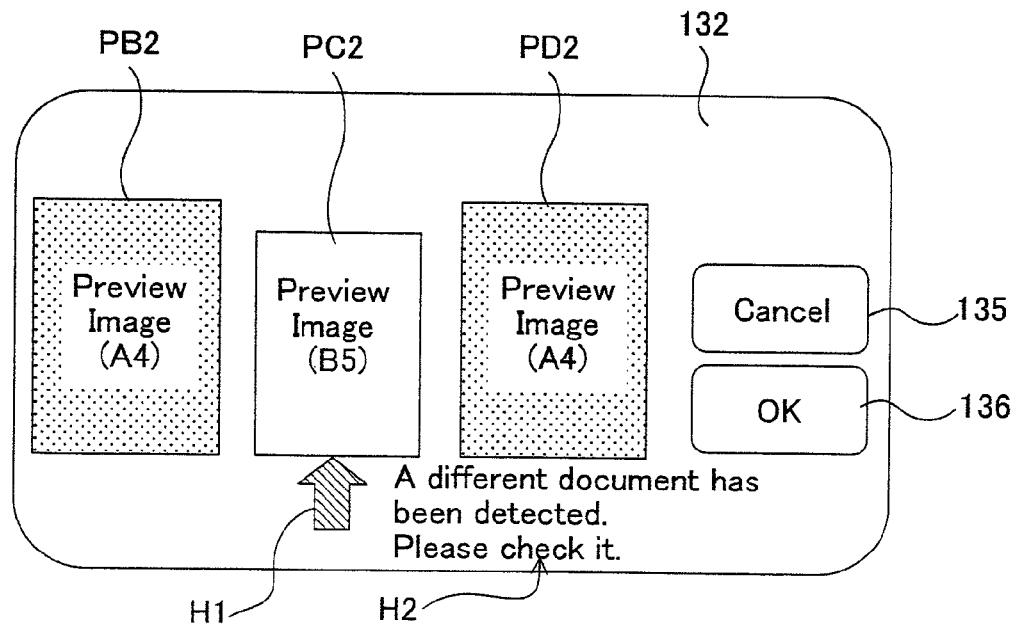
FIG. 4c is an illustrative view showing a display panel of the image forming apparatus, on which a preview image of a document different in size from a reference document and preview images of documents that are scanned before and after the document in question, are displayed side by side.

FIG. 4c is an illustrative view showing a display panel 132 of the image forming apparatus, on which a preview image PC2 of document C2 different in size from a reference document and preview images PB2 and PD2 of documents B2 and D2 (the reference documents) that are scanned before and after the document C2, are displayed side by side.

In example 2, multiple documents A2-D2 input into image forming apparatus 100 include A4-sized documents A2, B2 and D2 and an B5-sized document C2, as shown in FIG. 4a.

Image data of documents A2, B2, C2 and D2 are successively read by scanner portion 102 of image display unit 1 and recorded into storage 105. Then, based on the recorded image data (document page data), input condition determiner 111 successively determines whether there is a change in document size as one of the document image input conditions, between one document and the next.

As a result, input determiner 111 determines that the first two pages, i.e., documents A2 and B2 are of A4 size, document C2 is of B5 size, and that the size of document C2 is different from that of the previous page or document B2.

Then, based on the determined result from input condition determiner 111, display controller 112 displays a preview image PC2 of document C2 different in document size from the other documents and a preview image PB2 of document B2 as the reference for comparison, on display panel 132, as shown in FIG. 4b.

At this time, an arrow H1 that indicates preview image PC2 of document C2 to be checked is displayed on display panel 132, with a message H2, for example "A different document has been detected. Please check it" for promoting the user to confirm the document, arranged near arrow H1.

As described above, in example 2, image display unit 1 displays preview image PB2 of the second document B2 to be the reference for comparison on the document size as one of document input conditions and preview image PC2 of the third document C2 to be checked, at the same time. Accordingly, it is possible for the user to easily compare and confirm how document C2 to be checked is different in size from document B2 as the reference for comparison, among the multiple pages of documents A2, B2, C2 and D2.

As a variation of example 2, the preview display by display controller 112 may be given such that in addition to preview image PB2 of document B2 or the previous page of document C2 to be checked, preview image PD2 of the next page, or document D2 may be arranged so as to place the preview image PC2 to be confirmed between the two. This arrangement enables the user to much more easily confirm how document C2 to be checked is different in document size from documents B2 and D2 as the reference for comparison, among the multiple pages of documents A2, B2, C2 and D2.

Next, determination of the document type at the time of reading a plurality of documents will be described with reference to a flow chart.

Figure 5:
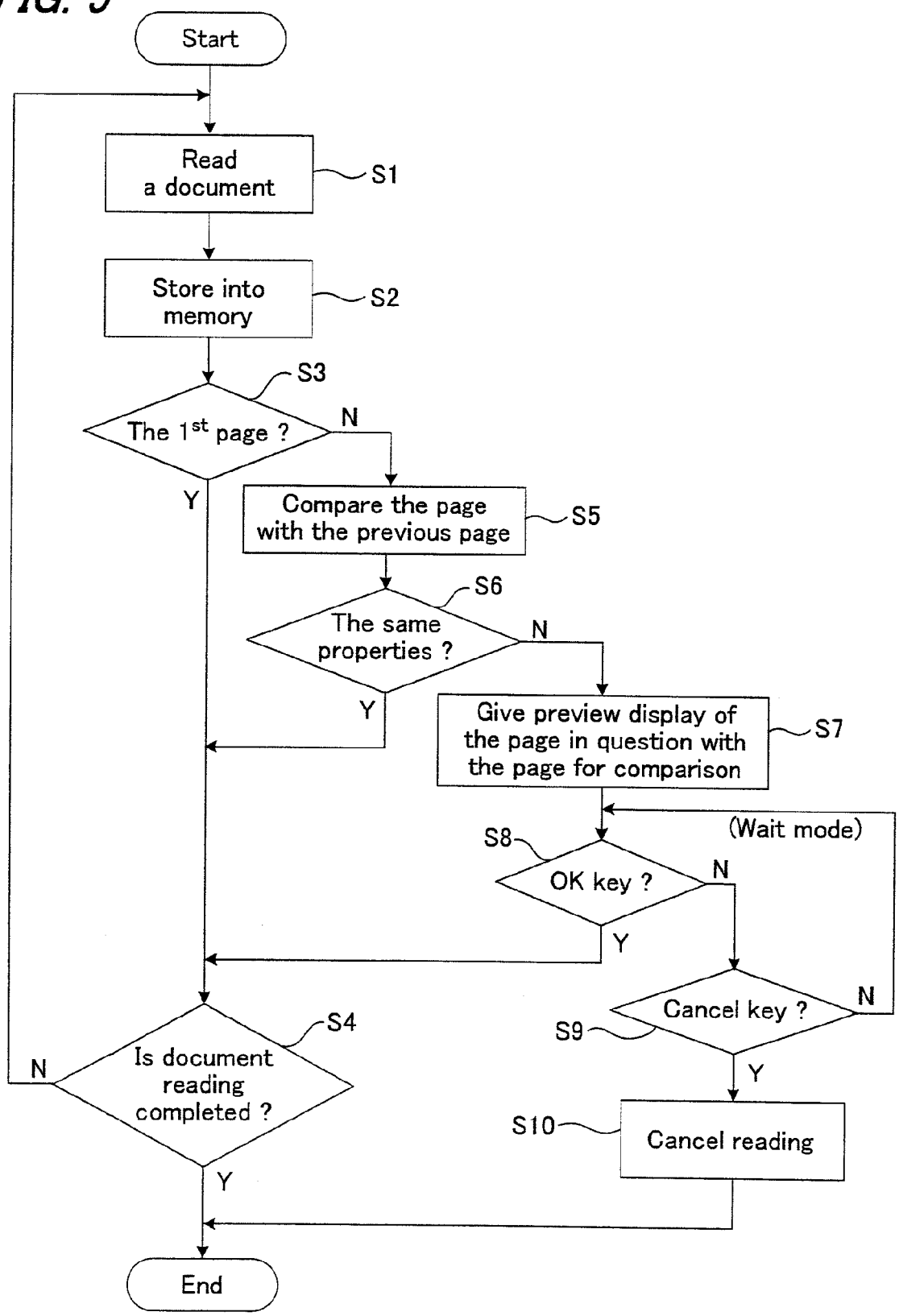
FIG. 5 is a flow chart for illustrating the processing steps to be implemented by an image display unit in the image forming apparatus to read a plurality of documents and perform preview display based on determined result; and, FIG. 6 is a flow chart for illustrating the image data processing steps to be implemented after preview display by an image display unit in the image forming apparatus.

FIG. 5 is a flow chart illustrating the processing steps in image display unit 1 to read a plurality of documents and perform preview display based on a determined result.

As shown in FIG. 5, when image display unit 1 in image forming apparatus 100 starts reading a plurality of documents, scanner portion 102 reads the documents page-wise (Step S1) and records the image data of the documents into storage 105 (Step S2).

Then, it is determined whether or not the read document is the first page (Step S3).

At Step S3, if it is determined that the document is the first page, the control goes to Step S4, where it is determined whether or not document reading has been completed.

If it is determined at Step S4 that document reading has been completed, the processing of reading the documents is ended. If it is determined at Step S4 that document reading has not been completed, the control goes to Step S1 and reading of the next document is carried out.

On the other hand, if it is determined at Step S3 that the document is not the first page, input condition determiner 111 compares the image data of that document with the image data of the document that was read last (the previous page) (Step S5) so as to determine whether the properties, i.e., the input conditions (document size, the color type of document image (color or monochrome)) of the current document are the same as those of the document that was read last (Step S6).

If it is determined at Step S6 that the properties, i.e., the input conditions (document size, the color type of document image (color or monochrome), etc.) of that document and the previously read document, are the same, the control returns to Step S4.

On the other hand, if it is determined at Step S6 that the input conditions of that document and the previously read document are different, the preview of the document image whose input conditions were determined to be different is displayed on display panel 132, together with the preview of the previously read document image (the document image on the previous page) for comparison (Step S7). With this display, it is possible for the user to easily confirm how the document that was determined to be different in input conditions is dissimilar to the other document.

Then, at Step S8, it is selected whether an OK key 136 is pressed or not. When OK key 136 is pressed, the control goes to Step S4. If OK key 136 is not pressed, it is selected whether a cancel key 135 is pressed or not (Step S9).

As cancel key 135 is pressed, the action of document reading is canceled (Step S10) and the document reading process is ended. If cancel key 135 is not pressed, the control returns to Step S8, and the apparatus enters wait mode to wait for next instruction.

In the above way, image forming apparatus 1 reads a plurality of documents and determines whether there is any difference in input conditions between the read documents and display the result on display panel 132. As a result it is possible for the user to easily confirm the difference in properties between the documents.

Here in the present embodiment, reading of documents are performed returning to Step S1 if document reading has not been completed in Step S4. However, the present invention should not limit the processing sequence of document reading. For example, scanner portion 102 reads a plurality of documents first so that the image data of the read multiple documents are recorded in storage 105. Thereafter, the image data to be compared may be successively loaded from storage 105 to be used for comparison.

Next, the image data process that follows the aforementioned document determination, after preview display of image display unit 1 in image forming apparatus 100 will be described with reference to a flow chart.

Figure 6:
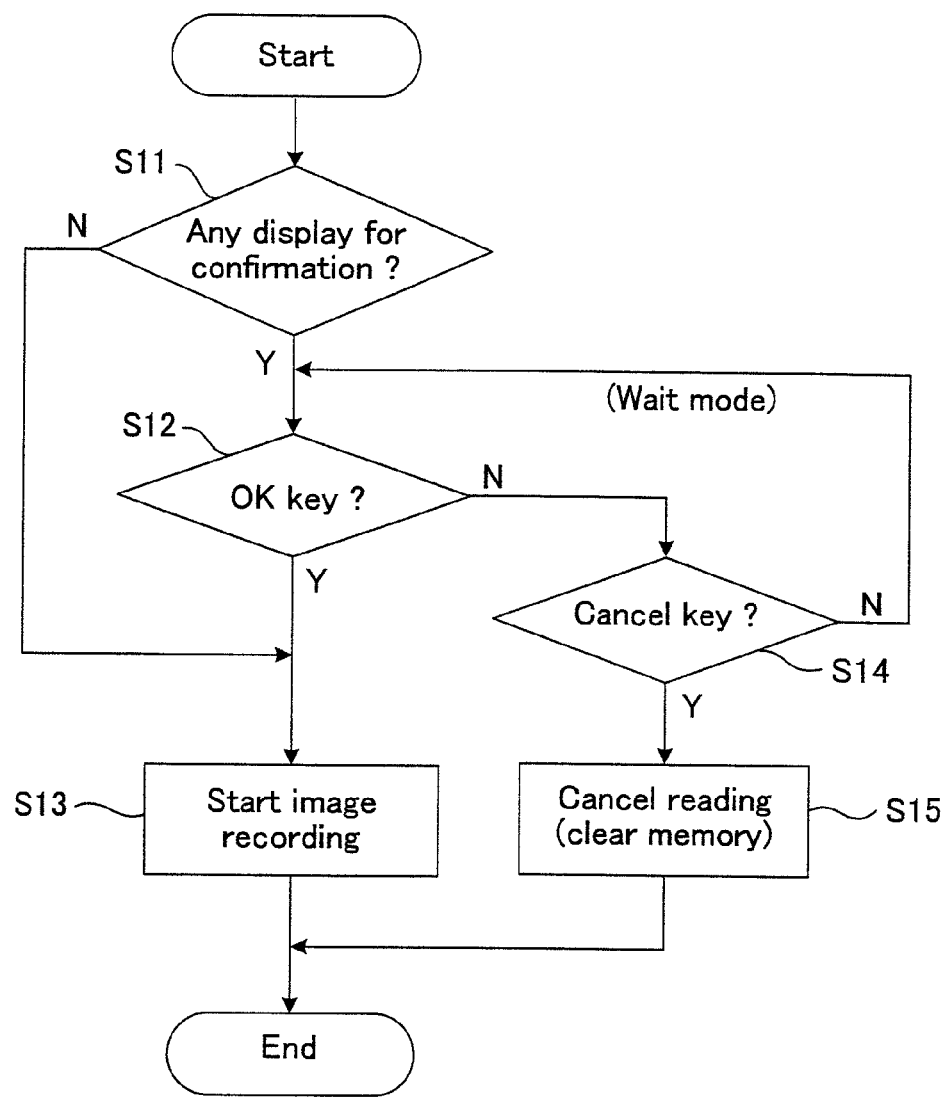

FIG. 6 is a flow chart for illustrating the image data processing steps to be implemented after preview display by image display unit 1.

As shown in FIG. 6, it is determined in image display unit 1, whether the image of a document that was determined based on the document input conditions read by scanner portion 102 is displayed in preview representation on display panel 132 (Step S11).

If it is determined at Step S11 that the image of the document that needs confirmation is displayed in preview representation on display panel 132, it is selected whether or not OK key 136 is pressed (Step S12).

When OK key 136 is pressed at Step S12, the process of recording image onto the paper is started (Step S13), and image data processing is ended.

If OK key 136 is not pressed at Step S12, it is selected whether or not cancel key 135 is pressed or not (Step S14).

As cancel key 135 is pressed, the action of document reading is canceled while the memory is cleared (Step S15), and the image data processing is ended. If cancel key 135 is not pressed, the control returns to Step S12, and the apparatus enters wait mode to wait for next instruction.

In this way, it is possible to perform image output after the difference between the read documents has been clearly confirmed through image display unit 1.

According to the present embodiment having the configuration described heretofore, since image display unit 1 in image forming apparatus 100 is provided with input condition determiner 111 and display controller 112, when a plurality of documents are scanned (input) successive documents are compared to each other as to input conditions so that the preview image of a document to be the reference in comparison for the document input conditions and the preview image of a document to be confirmed are displayed at once on display panel 132. As a result, it is possible for the user to easily compare and confirm how the document to be checked is different from the document as reference for comparison.

Further, in the present embodiment, as the capabilities to determine the input conditions of the image data of the documents captured by scanner portion 102, input condition determiner 111 is provided with a function of determining whether or not the documents have changed in size based on the document size information (document size determining function) and a function of determining whether or not the documents have changed in color type (e.g., color or monochrome) based on the color type information on image data (document image color type determining function). Accordingly, it is possible to determine the difference in document size and in document image color type as document input conditions.

Further, since display controller 112 makes control based on the determined result from input condition determiner 111 so that the image data that was determined to have changed in input conditions and the image data input immediately before the image data in question are displayed together on display panel 132, it is possible for the user to easily compare and confirm how the document different in input conditions differs from the other.

Further, when input condition determiner 111 determines that the image data has changed in input conditions, display controller 112 functions to display the image data in question and the image data input immediately after the image data in question, together on display panel 132, it is possible to make the user compare and clearly confirm how the document different in input conditions differs from the others.

The above embodiment was described taking an example in which image display unit 1 is applied to image forming apparatus 100 shown in FIG. 1. However, as long as it is an image forming apparatus that can present document images in preview representation on the display panel or the like before printing, the invention can be developed to any other image forming apparatus and the like, not limited to the image forming apparatus and copier having the configuration described above.

Having described heretofore, the present invention is not limited to the above embodiment, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image display unit capable of displaying image data page-wise, comprising:
   an image data input portion configured to successively input a plurality of pages of page-wise image data;
   a display portion configured to display the image data input from the image data input portion in preview representation;
   an input condition determiner configured to perform a determination process for determining whether there is any change in a second input condition of a determination image data as a second image data to be determined in comparison with a first input condition of a reference image data as a first image data, the determination image data being an image data subsequently inputted immediately after the reference image data by the image data input portion; and, a display controller configured to, when the input condition determiner determines that there is a change in the second input condition compared with the first input condition, makes control such as to display, in parallel, the reference image data and the determination image data side by side together on the display portion, and when the input condition determiner determines that there is no change in the second input condition compared with the first input condition, makes control such as not to display the reference image data and the determination image data on the display portion, wherein the input condition determiner is configured to repeat the determination process, after completion of a previous determination process, by replacing the first image data as the reference image data with a second image data as the determination image data and by replacing the second image data as the determination image data with a third image data inputted immediately after the second image data, thereby the second image data becoming the reference image data and the third image data becoming the determination image data.

2. The image display unit according to claim 1, wherein the display controller makes control such as to display also the third image data input immediately after the second image data that was determined to have changed in the input condition, on the display portion.

3. The image display unit according to claim 2, wherein the first input condition is one page size of the first image data, and the second input condition is one page size of the second image data.

4. The image display unit according to claim 2, wherein the first input condition is color type information used in the first image data, and the second input condition is color type information used in the second image data.

5. The image display unit according to claim 1, wherein the first input condition is one page size of the first image data, and the second input condition is one page size of the second image data.

6. The image display unit according to claim 1, wherein the first input condition is color type information user in the first image data, and the second input condition is one page size of the second image data.

7. An image forming apparatus including the image display unit according to claim 1.

* * * * *